United States Patent
Tsai (10) Patent No.: US 10,001,633 B1
(45) Date of Patent: Jun. 19, 2018

(54) SIX-PIECE MICROSCOPE LENS SYSTEM

(71) Applicant: NEWMAX TECHNOLOGY CO., LTD., Tai-Chung (TW)

(72) Inventor: Fei-Hsin Tsai, Tai-Chung (TW)

(73) Assignee: NEWMAX TECHNOLOGY CO., LTD., Tai-Chung (TW)

( * ) Notice: Subject to any disclaimer, the term of this patent is extended or adjusted under 35 U.S.C. 154(b) by 0 days. days.

(21) Appl. No.: 15/384,285

(22) Filed: Dec. 19, 2016

(51) Int. Cl.
*G02B 21/02* (2006.01)
*G02B 9/62* (2006.01)
*G02B 13/18* (2006.01)
*G02B 13/00* (2006.01)

(52) U.S. Cl.
CPC .............. *G02B 21/02* (2013.01); *G02B 9/62* (2013.01); *G02B 13/00* (2013.01); *G02B 13/18* (2013.01)

(58) Field of Classification Search
CPC ...... G02B 21/02; G02B 21/025; G02B 13/00; G02B 13/18; G02B 13/0045; G02B 13/005; G02B 9/62; G02B 9/60; G02B 9/64
USPC ................................ 359/658, 656, 657, 659
See application file for complete search history.

(56) References Cited

U.S. PATENT DOCUMENTS

| | | | | |
|---|---|---|---|---|
| 6,008,884 | A * | 12/1999 | Yamaguchi ......... | G03F 7/70241 355/53 |
| 9,798,112 | B2 * | 10/2017 | Huang ............... | G02B 13/0045 |
| 2012/0050892 | A1 * | 3/2012 | Lai ...................... | G02B 13/0045 359/786 |
| 2012/0075693 | A1 * | 3/2012 | Kim .................... | G02B 21/0008 359/368 |
| 2013/0135739 | A1 * | 5/2013 | Toshi ..................... | G02B 21/02 359/558 |
| 2013/0170021 | A1 * | 7/2013 | Mukai .................... | G02B 21/02 359/368 |
| 2014/0043695 | A1 * | 2/2014 | Hsu .......................... | G02B 9/62 359/713 |
| 2015/0015765 | A1 * | 1/2015 | Lee ...................... | G02B 27/646 348/335 |
| 2015/0131172 | A1 * | 5/2015 | Park, II .............. | G02B 13/0045 359/759 |
| 2015/0205071 | A1 * | 7/2015 | Hashimoto ........ | G02B 13/0045 359/713 |
| 2015/0248001 | A1 * | 9/2015 | Wartmann ........... | G02B 13/143 359/658 |
| 2015/0338613 | A1 * | 11/2015 | Tang ....................... | G02B 9/62 359/713 |
| 2016/0062083 | A1 * | 3/2016 | Hsueh ................ | G02B 13/0045 359/713 |
| 2016/0103308 | A1 * | 4/2016 | Furuya ................... | G02B 21/02 359/368 |
| 2016/0124184 | A1 * | 5/2016 | Tang .................. | G02B 13/0045 359/713 |

(Continued)

*Primary Examiner* — William R Alexander
(74) *Attorney, Agent, or Firm* — Bruce Stone LLP; Joseph Bruce (57) ABSTRACT

A six-piece microscope lens system includes, in order from the object side to the image side: a first lens element with a positive refractive power, a stop, a second lens element with a positive refractive power, a third lens element with a negative refractive power, a fourth lens element with a positive refractive power, a fifth lens element with a positive refractive power, a sixth lens element with a negative refractive power. Such arrangements can reduce the volume so as to reduce the manufacturing cost, has high pixel and image magnification 4.5×, and can detect biological fluid.

19 Claims, 4 Drawing Sheets

(56) References Cited

U.S. PATENT DOCUMENTS

| | | | |
|---|---|---|---|
| 2016/0124186 A1* | 5/2016 | Tang | G02B 13/0045 |
| | | | 359/713 |
| 2016/0124193 A1* | 5/2016 | Kim | G02B 13/0045 |
| | | | 359/713 |
| 2016/0131870 A1* | 5/2016 | Tang | G02B 13/0045 |
| | | | 359/713 |
| 2016/0131871 A1* | 5/2016 | Tang | G02B 13/0045 |
| | | | 359/713 |
| 2016/0195698 A1* | 7/2016 | Gong | G02B 13/0045 |
| | | | 359/713 |
| 2016/0216486 A1* | 7/2016 | Tanaka | G02B 13/0045 |
| 2017/0227740 A1* | 8/2017 | Hsueh | G02B 13/0045 |

* cited by examiner

SIX-PIECE MICROSCOPE LENS SYSTEM

BACKGROUND

Field of the Invention

The present invention relates to a microscope lens system, and more particularly to a six-piece microscope lens system.

Description of the Prior Art

Optical microscope has been widely applied to objects in cover glass, the optical system can usually provide the image of the object on the focal plane. The optical element of the optical microscope mainly includes two kinds of image taking lenses (eye lens and objective lens) and a convergent lens. The eye lens and the objective lens are provided for magnifying the image of the object and projecting it onto the retina of the viewer or film of camera. The convergent lens is used to gather the incident light on the object. In order to provide the incident light, the optical microscope illumination system may include an incident light source or guide an external natural light or artificial light to the convergent lens. In addition, the optical microscope can selectively use the optical assembly for enhancing image contrast. Moreover, the optical microscope can also use a mobile platform that can carry the object to the optical path and allow the object to move in and out of the focal plane, even move along the optical axis right, left or rotate along the optical axis.

However, at present, no matter the size of magnification and the volume of the optical system are too large. In particular, the cost of the cavity for holding the microscope lens system is too high and the space utilization is poor. Therefore, how to develop a microscope lens system that can reduce the volume so as to reduce the manufacturing cost, has high pixel and image magnification 4.5×, and can detect biological fluid is the motivation of the present invention.

The present invention mitigates and/or obviates the aforementioned disadvantages.

SUMMARY OF THE INVENTION

The primary objective of the present invention is to provide a six-piece microscope lens system that can reduce the volume so as to reduce the manufacturing cost, has high pixel and image magnification 4.5×, and can detect biological fluid.

Therefore, a six-piece microscope lens system in accordance with the present invention comprises, in order from an object side to an image side: a first lens element with a positive refractive power having an image-side surface being convex near an optical axis, at least one of an object-side surface and the image-side surface of the first lens element being aspheric; a stop; a second lens element with a positive refractive power having an object-side surface being convex near the optical axis, at least one of the object-side surface and an image-side surface of the second lens element being aspheric; a third lens element with a negative refractive power having an image-side surface being concave near the optical axis, at least one of an object-side surface and the image-side surface of the third lens element being aspheric; a fourth lens element with a positive refractive power having an image-side surface being concave near the optical axis, at least one of an object-side surface and the image-side surface of the fourth lens element being aspheric; a fifth lens element with a positive refractive power having an image-side surface being convex near the optical axis, at least one of an object-side surface and the image-side surface of the fifth lens element being aspheric; a sixth lens element with a negative refractive power having an object-side surface being convex near the optical axis, at least one of the object-side surface and an image-side surface of the sixth lens element being aspheric.

Preferably, a focal length of the first lens element is f1, a focal length of the second lens element is f2, and they satisfy the relation: $1.0<f1/f2<3.0$, so that the refractive power of the first lens element and the second lens element are more suitable, it will be favorable to obtain a wide field of view and avoid the excessive increase of aberration of the system.

Preferably, the focal length of the second lens element is f2, a focal length of the third lens element is f3, and they satisfy the relation: $-2.0<f2/f3<-0.8$, so that the refractive power of the third lens element can be distributed effectively and will not be too large, it will be favorable to reduce the sensitivity of the system and reduce the aberration.

Preferably, the focal length of the third lens element is f3, a focal length of the fourth lens element is f4, and they satisfy the relation: $-0.3<f3/f4<-0.1$, so that the refractive power of the system can be balanced effectively, so as to correct the aberration of the six-piece microscope lens system.

Preferably, the focal length of the fourth lens element is f4, a focal length of the fifth lens element is f5, and they satisfy the relation: $3.0<f4/f5<7.0$, so that the chromatic aberration of the lens group of the image system can be balanced and the image quality can be improved.

Preferably, the focal length of the fifth lens element is f5, a focal length of the sixth lens element is f6, and they satisfy the relation: $-1.0<f5/f6<-0.5$, so that the refractive power of the rear group lens system is more balanced, it will be favorable to reduce the sensitivity of the system and correct the high order aberrations of the system.

Preferably, the focal length of the first lens element is f1, the focal length of the third lens element is f3, and they satisfy the relation: $-3.5<f1/f3<-2.0$, so that the refractive power of the first lens element can be distributed effectively, so as to reduce the sensitivity of the six-piece microscope lens system.

Preferably, the focal length of the second lens element is f2, the focal length of the fourth lens element is f4, and they satisfy the relation: $0.1<f2/f4<0.4$, which is favorable to increase the field of view and enlarge the stop of the six-piece microscope lens system. Meanwhile, the assembling tolerance can be reduced to improve yield rate.

Preferably, the focal length of the third lens element is f3, the focal length of the fifth lens element is f5, and they satisfy the relation: $-1.1<f3/f5<-0.45$, which is favorable to increase the field of view and enlarge the stop of the six-piece microscope lens system. Meanwhile, the assembling tolerance can be reduced to improve yield rate.

Preferably, the focal length of the fourth lens element is f4, the focal length of the sixth lens element is f6, and they satisfy the relation: $-4.0<f4/f6<-2.2$, which can reduce the sensitivity and the total length of the six-piece microscope lens system.

Preferably, the focal length of the first lens element is f1, a focal length of the second lens element and the third lens element combined is f23, and they satisfy the relation: $-0.25<f1/f23<-0.05$. If f1/f23 satisfies the above relation, a wide field of view can be obtained and the resolution can be improved evidently.

Preferably, the focal length of the second lens element is f2, a focal length of the third lens element and the fourth lens element combined is f34, and they satisfy the relation: $-1.5<f2/f34<-0.8$, which is favorable to increase the field of view and enlarge the stop of the six-piece microscope lens system. Meanwhile, the assembling tolerance can be reduced to improve yield rate.

Preferably, the focal length of the second lens element and the third lens element combined is f23, a focal length of the fourth lens element and the fifth lens element combined is f45, and they satisfy the relation: $-16.0 < f23/f45 < -7.0$. If f23/f45 satisfies the above relation, a wide field of view, high pixel and low height can be provided and the resolution can be improved evidently. Contrarily, if f23/f45 exceeds the above range, the performance and resolution of the six-piece microscope lens system will be reduced, and the yield rate will be low.

Preferably, the focal length of the third lens element and the fourth lens element combined is f34, a focal length of the fifth lens element and the sixth lens element combined is f56, and they satisfy the relation: $-1.25 < f34/f56 < -0.60$. If f34/f56 satisfies the above relation, a wide field of view, high pixel and low height can be provided and the resolution can be improved evidently. Contrarily, if f34/f56 exceeds the above range, the performance and resolution of the six-piece microscope lens system will be reduced, and the yield rate will be low.

Preferably, the focal length of the fourth lens element and the fifth lens element combined is f45, the focal length of the sixth lens element is f6, and they satisfy the relation: $-1.3 < f45/f6 < -0.65$. If f45/f6 satisfies the above relation, a wide field of view, high pixel and low height can be provided and the resolution can be improved evidently. Contrarily, if f45/f6 exceeds the above range, the performance and resolution of the six-piece microscope lens system will be reduced, and the yield rate will be low.

Preferably, the focal length of the first lens element is f1, a focal length of the second lens element, the third lens element and the fourth lens element combined is f234, and they satisfy the relation: $0.05 < f1/f234 < 0.4$. Appropriate refractive power is favorable to reduce the spherical aberration and astigmatism of the six-piece microscope lens system effectively.

Preferably, the focal length of the second lens element, the third lens element and the fourth lens element combined is f234, the focal length of the fifth lens element and the sixth lens element combined is f56, and they satisfy the relation: $4.0 < f234/f56 < 15.0$. Appropriate refractive power is favorable to reduce the spherical aberration and astigmatism of the six-piece microscope lens system effectively.

Preferably, the focal length of the second lens element and the third lens element combined is f23, a focal length of the fourth lens element, the fifth lens element and the sixth lens element combined is f456, and they satisfy the relation: $-30 < f23/f456 < -12$. Appropriate refractive power is favorable to reduce the spherical aberration and astigmatism of the six-piece microscope lens system effectively.

Preferably, the focal length of the second lens element is f2, a focal length of the third lens element, the fourth lens element and the fifth lens element combined is f345, and they satisfy the relation: $0.55 < f2/f345 < 1.1$. Appropriate refractive power is favorable to reduce the spherical aberration and astigmatism of the six-piece microscope lens system effectively.

Preferably, the focal length of the first lens element is f1, a focal length of the second lens element, the third lens element, fourth lens element, the fifth lens element and the sixth lens element combined is f23456, and they satisfy the relation: $1.2 < f1/f23456 < 3.2$. If f1/f23456 satisfies the above relation, a wide field of view, high pixel and low height can be provided and the resolution can be improved evidently. Contrarily, if f1/f23456 exceeds the above range, the performance and resolution of the six-piece microscope lens system will be reduced, and the yield rate will be low.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
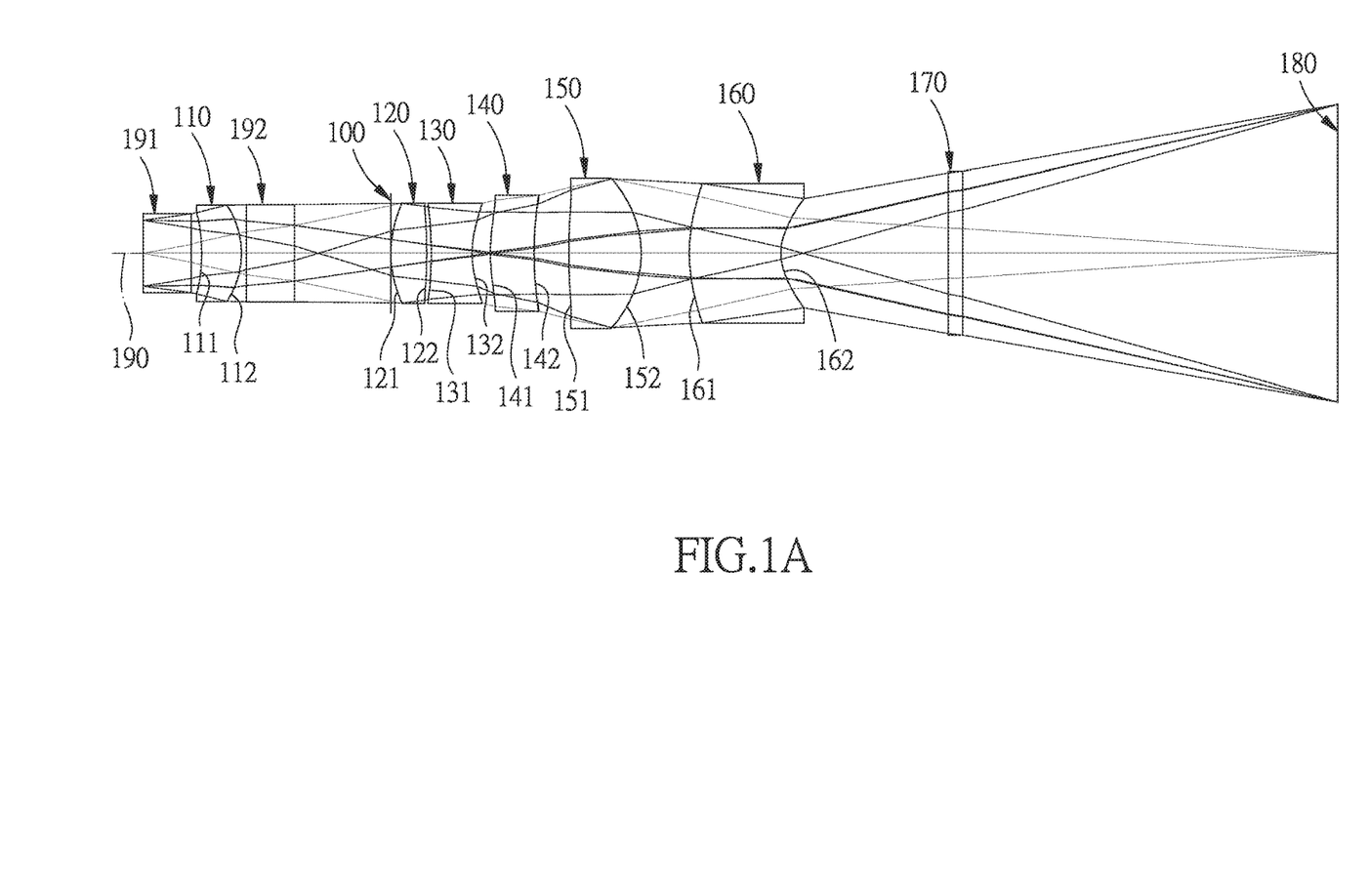
FIG. 1A shows a six-piece microscope lens system in accordance with a first embodiment of the present invention.
Figure 1B:
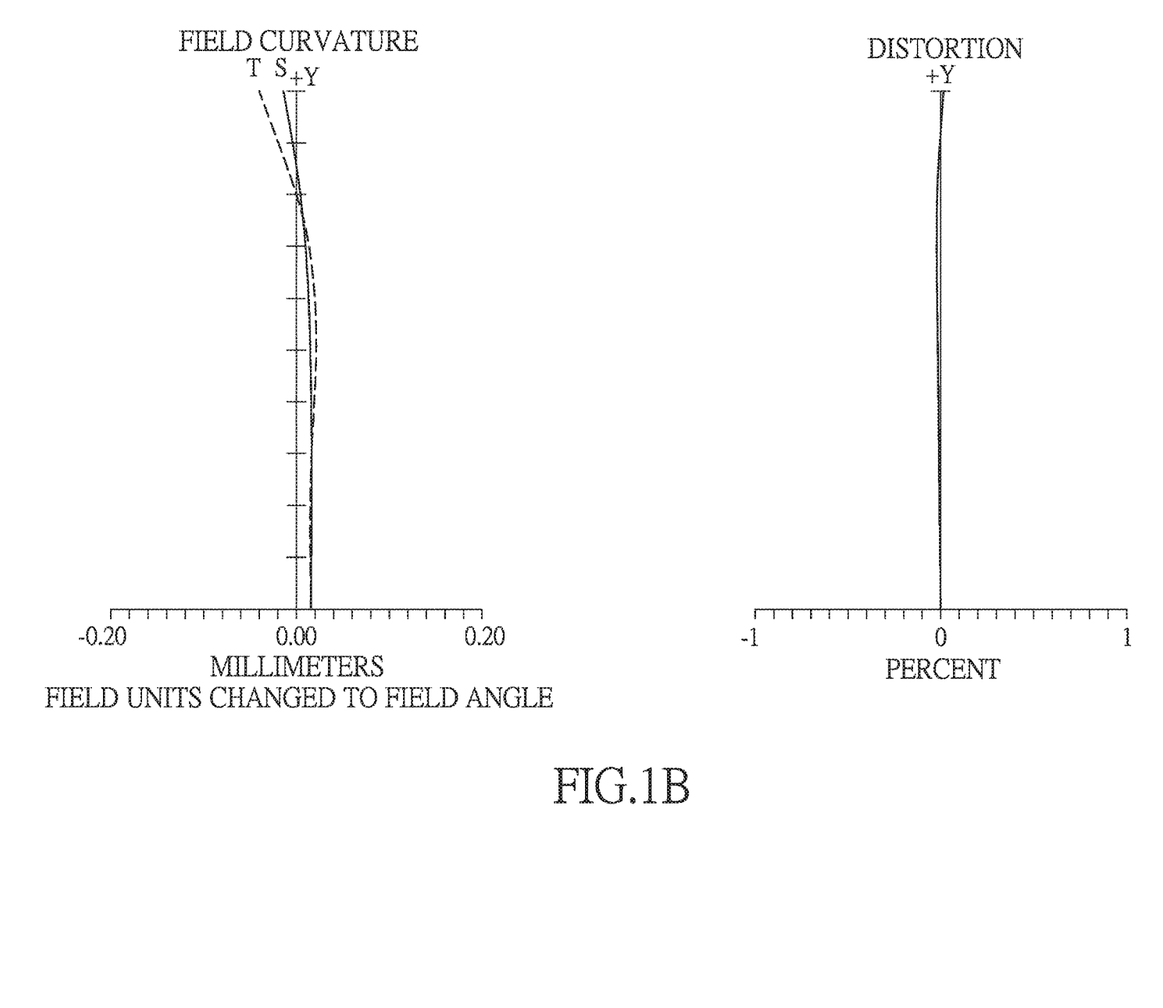
FIG. 1B shows the image plane curve and the distortion curve of the first embodiment of the present invention.

Referring to FIGS. 1A and 1B, FIG. 1A shows a six-piece microscope lens system in accordance with a first embodiment of the present invention, and FIG. 1B shows, in order from left to right, the image plane curve and the distortion curve of the first embodiment of the present invention. A six-piece microscope lens system in accordance with the first embodiment of the present invention comprises a stop 100 and a lens group. The lens group comprises, in order from an object side to an image side: a cover glass 191, a first lens element 110, a positioning piece 192, a second lens element 120, a third lens element 130, a fourth lens element 140, a fifth lens element 150, a sixth lens element 160, an IR cut filter 170, and an image plane 180, wherein the six-piece microscope lens system has a total of six lens elements with refractive power. The cover glass 191, the first lens element 110 and the positioning piece 192 form a front group lens system. The second lens element 120, the third lens element 130, the fourth lens element 140, the fifth lens element 150, the sixth lens element 160 and the IR cut filter 170 form a rear group lens system. The stop 100 is disposed between the positioning piece 192 and an image-side surface 122 of the second lens element 120.

The cover glass 191 made of glass is mainly provided for protecting and isolating the first lens element 110 so as to prevent the first lens element 110 from contacting with the object to be detected (such as, biological fluid), and is located between the object side and an object-side surface 111 of the first lens element 110 and has no influence on the focal length of the six-piece microscope lens system.

The first lens element 110 with a positive refractive power has the object-side surface 111 being concave near an optical axis 190 and an image-side surface 112 being convex near the optical axis 190, the object-side surface 111 and the image-side surface 112 are aspheric, and the first lens element 110 is made of plastic material.

The positioning piece 192 made of plastic material cooperates with the cover glass 191 to fix the first lens element 110, and is located between the image-side surface 112 of the first lens element 110 and an object-side surface 121 of the second lens element 120 and has no influence on the focal length of the six-piece microscope lens system.

The second lens element 120 with a positive refractive power has the object-side surface 121 being convex near the optical axis 190 and the image-side surface 122 being convex near the optical axis 190, the object-side surface 121 and the image-side surface 122 are aspheric, and the second lens element 120 is made of plastic material.

The third lens element 130 with a negative refractive power has an object-side surface 131 being concave near the optical axis 190 and an image-side surface 132 being concave near the optical axis 190, the object-side surface 131 and the image-side surface 132 are aspheric, and the third lens element 130 is made of plastic material.

The fourth lens element 140 with a positive refractive power has an object-side surface 141 being convex near the optical axis 190 and an image-side surface 142 being concave near the optical axis 190, the object-side surface 141 and the image-side surface 142 are aspheric, and the fourth lens element 140 is made of plastic material.

The fifth lens element 150 with a positive refractive power has an object-side surface 151 being convex near the optical axis 190 and an image-side surface 152 being convex near the optical axis 190, the object-side surface 151 and the image-side surface 152 are aspheric, and the fifth lens element 150 is made of plastic material.

The fifth lens element 160 with a negative refractive power has an object-side surface 161 being convex near the optical axis 190 and an image-side surface 162 being concave near the optical axis 190, the object-side surface 161 and the image-side surface 162 are aspheric, and the sixth lens element 160 is made of plastic material.

The IR cut filter 170 made of glass is located between the sixth lens element 160 and the image plane 180 and has no influence on the focal length of the six-piece microscope lens system.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, G, . . . : represent the high-order aspheric coefficients.

In the first embodiment of the present six-piece microscope lens system, a focal length of the six-piece microscope lens system is f, an object side numerical aperture of the six-piece microscope lens system is NA, a magnitude of enlargement of the six-piece microscope lens system is MA, and they satisfy the relations: f=2.999 mm; NA=0.3 mm; and MA=4.5.

In the first embodiment of the present six-piece microscope lens system, a focal length of the first lens element 110 is f1, a focal length of the second lens element 120 is f2, and they satisfy the relation: f1/f2=1.56.

In the first embodiment of the present six-piece microscope lens system, the focal length of the second lens element 120 is f2, a focal length of the third lens element 130 is f3, and they satisfy the relation: f2/f3=−1.46.

In the first embodiment of the present six-piece microscope lens system, the focal length of the third lens element 130 is f3, a focal length of the fourth lens element 140 is f4, and they satisfy the relation: f3/f4=−0.21.

In the first embodiment of the present six-piece microscope lens system, the focal length of the fourth lens element 140 is f4, a focal length of the fifth lens element 150 is f5, and they satisfy the relation: f4/f5=3.63.

In the first embodiment of the present six-piece microscope lens system, the focal length of the fifth lens element 150 is f5, a focal length of the sixth lens element 160 is f6, and they satisfy the relation: f5/f6=−0.75.

In the first embodiment of the present six-piece microscope lens system, the focal length of the first lens element 110 is f1, the focal length of the third lens element 130 is f3, and they satisfy the relation: f1/f3=−2.29.

In the first embodiment of the present six-piece microscope lens system, the focal length of the second lens element 120 is f2, the focal length of the fourth lens element 140 is f4, and they satisfy the relation: f2/f4=0.31.

In the first embodiment of the present six-piece microscope lens system, the focal length of the third lens element 130 is f3, the focal length of the fifth lens element 150 is f5, and they satisfy the relation: f3/f5=−0.77.

In the first embodiment of the present six-piece microscope lens system, the focal length of the fourth lens element 140 is f4, the focal length of the sixth lens element 160 is f6, and they satisfy the relation: f4/f6=−1.73.

In the first embodiment of the present six-piece microscope lens system, the focal length of the first lens element 110 is f1, a focal length of the second lens element 120 and the third lens element 130 combined is f23, and they satisfy the relation: f1/f23=−0.13.

In the first embodiment of the present six-piece microscope lens system, the focal length of the second lens element 120 is f2, a focal length of the third lens element 130 and the fourth lens element 140 combined is f34, and they satisfy the relation: f2/f34=−1.16.

In the first embodiment of the present six-piece microscope lens system, a focal length of the second lens element 120 and the third lens element 130 combined is f23, a focal length of the fourth lens element 140 and the fifth lens element 150 combined is f45, and they satisfy the relation: f23/f45=−10.25.

In the first embodiment of the present six-piece microscope lens system, the focal length of the third lens element 130 and the fourth lens element 140 combined is f34, a focal length of the fifth lens element 150 and the sixth lens element 160 combined is f56, and they satisfy the relation: f34/f56=−0.78.

In the first embodiment of the present six-piece microscope lens system, the focal length of the fourth lens element 140 and the fifth lens element 150 combined is f45, the focal length of the sixth lens element 160 is f6, and they satisfy the relation: f45/f6=−0.97.

In the first embodiment of the present six-piece microscope lens system, the focal length of the first lens element 110 is f1, a focal length of the second lens element 120, the third lens element 130 and the fourth lens element 140 combined is f234, and they satisfy the relation: f1/f234=0.23.

In the first embodiment of the present six-piece microscope lens system, the focal length of the second lens element 120, the third lens element 130 and the fourth lens element 140 combined is f234, the focal length of the fifth lens element 150 and the sixth lens element 160 combined is f56, and they satisfy the relation: f234/f56=6.26.

In the first embodiment of the present six-piece microscope lens system, the focal length of the second lens element 120 and the third lens element 130 combined is f23, a focal length of the fourth lens element 140, the fifth lens element 150 and the sixth lens element 160 combined is f456, and they satisfy the relation: f23/f456=−18.17.

In the first embodiment of the present six-piece microscope lens system, the focal length of the second lens element 120 is f2, a focal length of the third lens element 130, the fourth lens element 140 and the fifth lens element 150 combined is f345, and they satisfy the relation: f2/f345=0.84.

In the first embodiment of the present six-piece microscope lens system, the focal length of the first lens element 110 is f1, a focal length of the second lens element 120, the third lens element 130, the fourth lens element 140, the fifth lens element 150 and the sixth lens element 160 combined is f23456, and they satisfy the relation: f1/f23456=1.65.

The detailed optical data of the first embodiment is shown in table 1, and the aspheric surface data is shown in table 2.

TABLE 1

Embodiment 1
f(focal length) = 2.999 mm, NA = 0.3 mm, MA = 4.5.

| surface | | Curvature Radius | Thickness | Material | Index | Abbe # | Focal length |
|---|---|---|---|---|---|---|---|
| 0 | object | infinity | 0 | | | | |
| 1 | cover | infinity | 1.000 | glass | 1.585 | 30 | — |
| 2 | glass | infinity | 0.222 | | | | |
| 3 | Lens 1 | −4.269 (ASP) | 0.827 | plastic | 1.535 | 56 | 5.99 |
| 4 | | −1.960 (ASP) | 0.100 | | | | |
| 5 | positioning piece | infinity | 1.000 | plastic | 1.585 | 30 | — |
| 6 | | infinity | 2.000 | | | | |
| 7 | stop | infinity | 0.000 | | | | |
| 8 | Lens 2 | 2.258 (ASP) | 0.745 | plastic | 1.535 | 56 | 3.83 |
| 9 | | −20.691 (ASP) | 0.100 | | | | |
| 10 | Lens 3 | −14.411 (ASP) | 0.850 | plastic | 1.635 | 23.9 | −2.62 |
| 11 | | 1.949 (ASP) | 0.382 | | | | |
| 12 | Lens 4 | 3.893 (ASP) | 0.909 | plastic | 1.535 | 56 | 12.42 |
| 13 | | 8.583 (ASP) | 0.715 | | | | |
| 14 | Lens 5 | 13.894 (ASP) | 1.509 | plastic | 1.535 | 56 | 3.42 |
| 15 | | −2.037 (ASP) | 1.000 | | | | |
| 16 | Lens 6 | 3.273 (ASP) | 1.900 | plastic | 1.535 | 56 | −4.55 |
| 17 | | 1.115 (ASP) | 3.488 | | | | |
| 18 | IR cut filter | infinity | 0.300 | glass | 1.517 | 64.18 | — |
| 19 | | infinity | 7.795 | | | | |
| 20 | Image plane | infinity | infinity | | | | |

TABLE 2

| Aspheric Coefficients | | | | | | |
|---|---|---|---|---|---|---|
| surface | 3 | 4 | 8 | 9 | 10 | 11 |
| K: | 1.5126E+01 | −2.2017E+00 | −1.8781E+00 | −1.8015E+02 | 1.2664E+02 | −6.0581E+00 |
| A: | −2.0585E−02 | −5.6451E−02 | 6.9605E−03 | −2.3472E−02 | −5.7469E−02 | −2.0644E−02 |
| B: | 5.3554E−03 | −1.0096E−02 | 1.5524E−02 | 5.3990E−02 | 5.4116E−02 | 2.1626E−02 |
| C: | 3.5214E−02 | 1.2226E−02 | −3.9104E−02 | −9.3203E−02 | −1.3650E−02 | 5.3350E−03 |
| D: | −1.1132E−02 | −8.6956E−03 | 2.5095E−02 | 7.5773E−02 | −1.8019E−02 | −2.5020E−02 |
| E | 0.0000E+00 | 0.0000E+00 | −2.5206E−03 | −3.3340E−02 | 1.5375E−02 | 1.4927E−02 |
| F | 0.0000E+00 | 0.0000E+00 | −3.7464E−03 | 4.4030E−03 | −2.7819E−03 | −1.8136E−03 |

| surface | 12 | 13 | 14 | 15 | 16 | 17 |
|---|---|---|---|---|---|---|
| K: | −2.5295E+01 | 1.2071E+01 | 5.9638E+01 | −1.5354E+00 | −6.9821E+00 | −2.2753E+00 |
| A: | −5.8495E−03 | 2.4145E−03 | 1.0535E−02 | −1.2151E−03 | 8.1298E−03 | 2.9501E−02 |
| B: | −1.1193E−03 | −6.7908E−04 | −2.1697E−02 | −9.5344E−03 | −1.5817E−02 | −4.6038E−02 |
| C: | −1.0720E−04 | −2.0631E−04 | 1.7463E−02 | 7.0007E−03 | 1.6226E−02 | 7.0147E−02 |
| D: | 1.7760E−04 | −3.0121E−04 | −1.0657E−02 | −3.2573E−03 | −8.7375E−03 | −6.4889E−02 |
| E | 0.0000E+00 | 0.0000E+00 | 3.2651E−03 | 6.9114E−04 | 2.3671E−03 | 3.1760E−02 |
| F | 0.0000E+00 | 0.0000E+00 | −5.1015E−04 | 7.4649E−05 | −2.4194E−04 | −6.0657E−03 |

The units of the radius of curvature, the thickness and the focal length in table 1 are expressed in mm, the surface numbers 0-20 represent the surfaces sequentially arranged from the object-side to the image-side along the optical axis. In table 2, k represents the conic coefficient of the equation of the aspheric surface profiles, and A, B, C, D . . . : represent the high-order aspheric coefficients. The tables presented below for each embodiment are the corresponding schematic parameter and image plane curves, and the definitions of the tables are the same as Table 1 and Table 2 of the first embodiment. Therefore, an explanation in this regard will not be provided again.

Figure 2A:
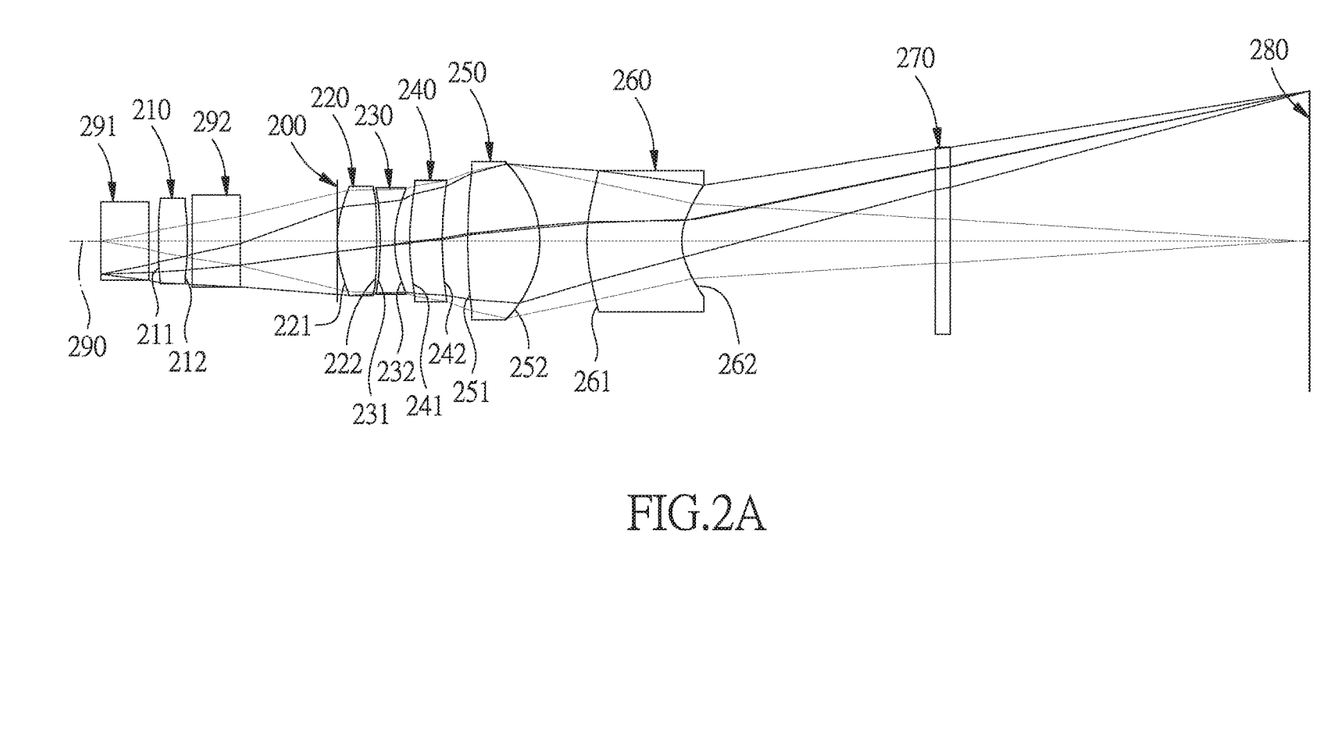
FIG. 2A shows a six-piece microscope lens system in accordance with a second embodiment of the present invention.
Figure 2B:
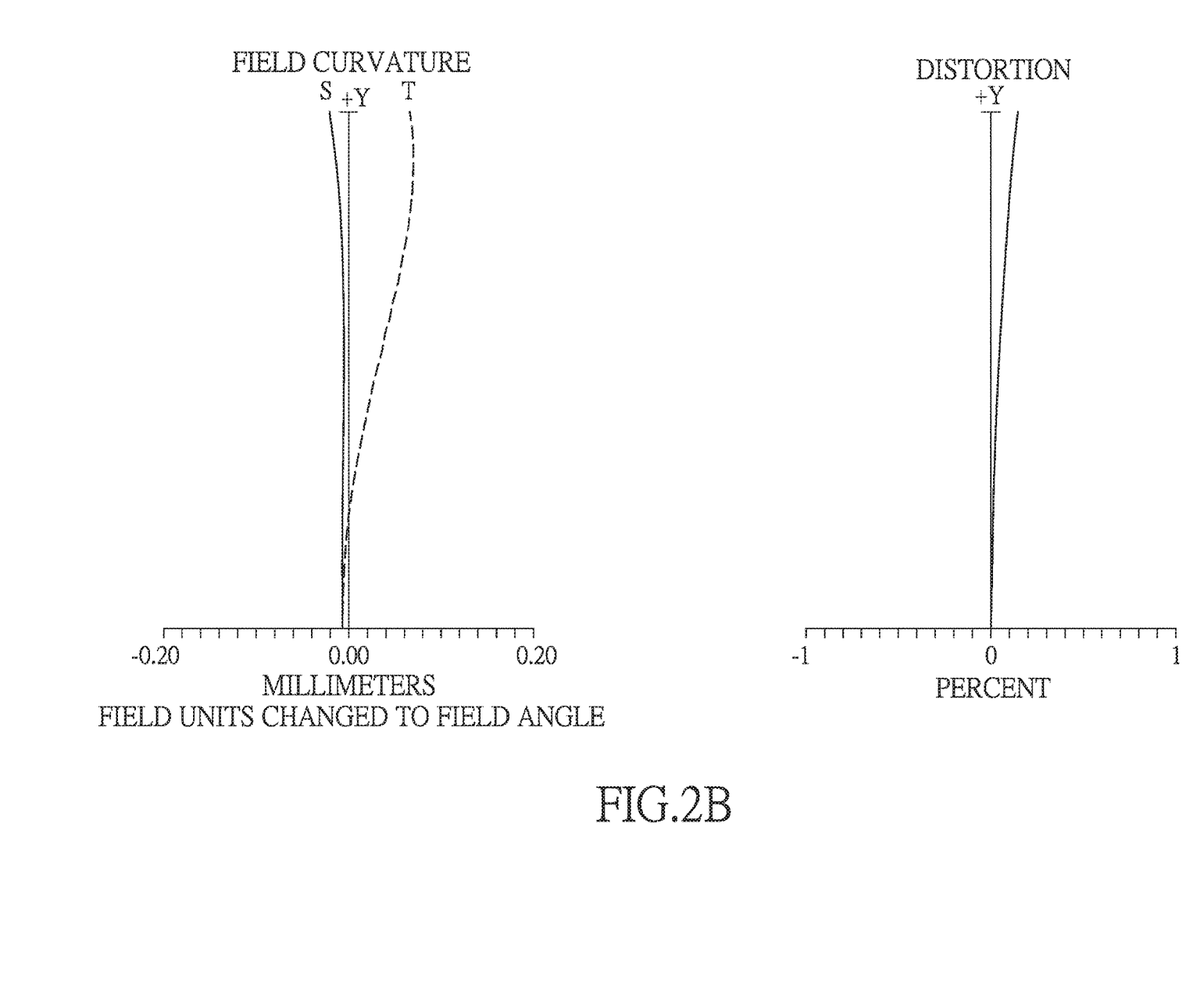
FIG. 2B shows the image plane curve and the distortion curve of the second embodiment of the present invention.

Referring to FIGS. 2A and 2B, FIG. 2A shows a six-piece microscope lens system in accordance with a second embodiment of the present invention, and FIG. 2B shows, in order from left to right, the image plane curve and the distortion curve of the second embodiment of the present invention. A six-piece microscope lens system in accordance with the second embodiment of the present invention comprises a stop 200 and a lens group. The lens group comprises, in order from an object side to an image side: a cover glass 291, a first lens element 210, a positioning piece 292, a second lens element 220, a third lens element 230, a fourth lens element 240, a fifth lens element 250, a sixth lens element 260, an IR cut filter 270, and an image plane 280, wherein the six-piece microscope lens system has a total of six lens elements with refractive power. The cover glass 291, the first lens element 210 and the positioning piece 292 form a front group lens system. The second lens element 220, the third lens element 230, the fourth lens element 240, the fifth lens element 250, the sixth lens element 260 and the IR cut filter 270 form a rear group lens system. The stop 200 is disposed between the positioning piece 292 and an image-side surface 222 of the second lens element 220.

The cover glass 291 made of glass is mainly provided for protecting and isolating the first lens element 210 so as to prevent the first lens element 210 from contacting with the object to be detected (such as, biological fluid), and is located between the object side and an object-side surface 211 of the first lens element 210 and has no influence on the focal length of the six-piece microscope lens system.

The first lens element 210 with a positive refractive power has the object-side surface 211 being convex near an optical axis 290 and an image-side surface 212 being convex near the optical axis 290, the object-side surface 211 and the image-side surface 212 are aspheric, and the first lens element 210 is made of plastic material.

The positioning piece 292 made of plastic material cooperates with the cover glass 291 to fix the first lens element 210, and is located between the image-side surface 212 of the first lens element 210 and an object-side surface 221 of the second lens element 220 and has no influence on the focal length of the six-piece microscope lens system.

The second lens element 220 with a positive refractive power has the object-side surface 221 being convex near the optical axis 290 and the image-side surface 222 being convex near the optical axis 290, the object-side surface 221 and the image-side surface 222 are aspheric, and the second lens element 220 is made of plastic material.

The third lens element 230 with a negative refractive power has an object-side surface 231 being concave near the optical axis 290 and an image-side surface 232 being concave near the optical axis 290, the object-side surface 231 and the image-side surface 232 are aspheric, and the third lens element 230 is made of plastic material.

The fourth lens element 240 with a positive refractive power has an object-side surface 241 being convex near the optical axis 290 and an image-side surface 242 being concave near the optical axis 290, the object-side surface 241 and the image-side surface 242 are aspheric, and the fourth lens element 240 is made of plastic material.

The fifth lens element 250 with a positive refractive power has an object-side surface 251 being convex near the optical axis 290 and an image-side surface 252 being convex near the optical axis 290, the object-side surface 251 and the image-side surface 252 are aspheric, and the fifth lens element 250 is made of plastic material.

The fifth lens element 260 with a negative refractive power has an object-side surface 261 being convex near the optical axis 290 and an image-side surface 262 being concave near the optical axis 290, the object-side surface 261 and the image-side surface 262 are aspheric, and the sixth lens element 260 is made of plastic material.

The IR cut filter 270 made of glass is located between the sixth lens element 260 and the image plane 280 and has no influence on the focal length of the six-piece microscope lens system.

The detailed optical data of the second embodiment is shown in table 3, and the aspheric surface data is shown in table 4.

TABLE 3

Embodiment 2
f(focal length) = 3.132 mm, NA = 0.3 mm, MA = 4.5.

| surface | | Curvature Radius | Thickness | Material | Index | Abbe # | Focal length |
|---|---|---|---|---|---|---|---|
| 0 | object | infinity | 0 | | | | |
| 1 | cover glass | infinity | 1.000 | glass | 1.585 | 30 | — |
| 2 | | infinity | 0.203 | | | | |
| 3 | Lens 1 | 69.556 (ASP) | 0.595 | plastic | 1.535 | 56 | 9.45 |
| 4 | | −5.458 (ASP) | 0.100 | | | | |
| 5 | positioning piece | infinity | 1.000 | plastic | 1.585 | 30 | — |
| 6 | | infinity | 2.000 | | | | |
| 7 | stop | infinity | 0.000 | | | | |
| 8 | Lens 2 | 2.265 (ASP) | 0.818 | plastic | 1.535 | 56 | 3.85 |
| 9 | | −20.574 (ASP) | 0.073 | | | | |
| 10 | Lens 3 | −14.935 (ASP) | 0.303 | plastic | 1.635 | 23.9 | −2.95 |
| 11 | | 2.187 (ASP) | 0.313 | | | | |
| 12 | Lens 4 | 5.214 (ASP) | 0.674 | plastic | 1.535 | 56 | 21.48 |
| 13 | | 9.082 (ASP) | 0.528 | | | | |

TABLE 3-continued

Embodiment 2
f(focal length) = 3.132 mm, NA = 0.3 mm, MA = 4.5.

| surface | | Curvature Radius | Thickness | Material | Index | Abbe # | Focal length |
|---|---|---|---|---|---|---|---|
| 14 | Lens 5 | 13.510 (ASP) | 1.493 | plastic | 1.535 | 56 | 3.34 |
| 15 | | −1.987 (ASP) | 0.973 | | | | |
| 16 | Lens 6 | 3.218 (ASP) | 1.971 | plastic | 1.535 | 56 | −5.44 |
| 17 | | 1.203 (ASP) | 5.258 | | | | |
| 18 | IR cut filter | infinity | 0.300 | glass | 1.517 | 64.18 | — |
| 19 | | infinity | 7.449 | | | | |
| 20 | Image plane | infinity | infinity | | | | |

TABLE 4

Aspheric Coefficients

| surface | 3 | 4 | 8 | 9 | 10 | 11 |
|---|---|---|---|---|---|---|
| K: | 1.9079E+02 | −4.1779E+01 | −2.2843E+00 | −1.5646E+02 | 1.2251E+02 | −4.8682E+00 |
| A: | 1.1231E−02 | −2.4477E−02 | 6.9787E−03 | −7.3281E−03 | −5.8409E−02 | −1.1384E−02 |
| B: | 5.0993E−02 | 3.6142E−02 | −7.1845E−03 | −3.3400E−03 | 5.2537E−02 | 2.6092E−02 |
| C: | 2.4559E−02 | 1.2232E−02 | 1.1842E−02 | 8.1645E−05 | −1.4685E−02 | 5.7563E−03 |
| D: | −1.0922E−02 | 7.3076E−03 | −2.8598E−02 | −2.7566E−02 | −1.8836E−02 | −2.5122E−02 |
| E | 0.0000E+00 | 0.0000E+00 | 2.0039E−02 | 2.2408E−02 | 1.5101E−02 | 1.3320E−02 |
| F | 0.0000E+00 | 0.0000E+00 | −5.7266E−03 | −5.6895E−03 | −2.6645E−03 | −2.0774E−03 |

| surface | 12 | 13 | 14 | 15 | 16 | 17 |
|---|---|---|---|---|---|---|
| K: | −9.4260E+00 | −1.3782E+00 | 6.8313E+01 | −2.3942E+00 | −9.3349E+00 | −2.3942E+00 |
| A: | −3.2696E−03 | 1.7942E−03 | 1.4405E−02 | −2.7417E−03 | 1.4302E−02 | 2.5305E−02 |
| B: | −1.5167E−03 | 7.4513E−04 | −2.1033E−02 | −9.5482E−03 | −2.3839E−02 | −4.9040E−02 |
| C: | −3.0632E−04 | 9.3330E−05 | 1.7731E−02 | 7.0490E−05 | 1.7920E−02 | 6.4311E−02 |
| D: | 6.6115E−05 | −1.6139E−04 | −1.0681E−02 | −3.1861E−03 | −8.5824E−03 | −5.3599E−02 |
| E | −1.1787E−04 | 4.3140E−05 | 3.2869E−03 | 7.1424E−04 | 2.3591E−03 | 2.5788E−02 |
| F | −1.6328E−04 | 1.1397E−05 | −4.4673E−04 | 7.2338E−05 | −2.6313E−04 | −5.1495E−03 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | |
|---|---|
| f[mm] | 3.132 |
| NA[mm] | 0.3 |
| MA | 4.50 |
| f1/f2 | 2.46 |
| f2/f3 | −1.30 |
| f3/f4 | −0.14 |
| f4/f5 | 6.44 |
| f5/f6 | −0.61 |
| f1/f3 | −3.20 |
| f2/f4 | 0.18 |
| f3/f5 | −0.88 |
| f4/f6 | −3.95 |
| f1/f23 | −0.15 |
| f2/f34 | −1.14 |
| f23/f45 | −13.30 |
| f34/f56 | −0.92 |
| f45/f6 | −0.89 |
| f1/f234 | 0.21 |
| f234/f56 | 12.25 |

-continued

| Embodiment 2 | |
|---|---|
| f23/f456 | −25.32 |
| f2/f345 | 0.74 |
| f1/f23456 | 2.86 |

In the present six-piece microscope lens system, the cover glass, the positioning piece and the lens elements can be made of plastic or glass. If the lens elements are made of plastic, the cost will be effectively reduced. If the lens elements are made of glass, there is more freedom in distributing the refractive power of the six-piece microscope lens system. Plastic lens elements can have aspheric surfaces, which allow more design parameter freedom (than spherical surfaces), so as to reduce the aberration and the number of the lens elements, as well as the total track length of the six-piece microscope lens system.

In the present six-piece microscope lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The six-piece microscope lens system of the present invention can be used in focusing optical systems and can obtain better image quality.

While we have shown and described various embodiments in accordance with the present invention, it should be clear to those skilled in the art that further embodiments may be made without departing from the scope of the present invention.

What is claimed is:

1. A six-piece microscope lens system, in order from an object side to an image side, comprising:
    a first lens element with a positive refractive power, having an image-side surface being convex near the optical axis, at least one of an object-side surface and the image-side surface of the first lens element being aspheric;
    a stop;
    a second lens element with a positive refractive power, having an object-side surface being convex near the optical axis, at least one of the object-side surface and an image-side surface of the second lens element being aspheric;
    a third lens element with a negative refractive power, having an image-side surface being concave near the optical axis, at least one of an object-side surface and the image-side surface of the third lens element being aspheric;
    a fourth lens element with a positive refractive power, having an image-side surface being concave near the optical axis, at least one of an object-side surface and the image-side surface of the fourth lens element being aspheric;
    a fifth lens element with a positive refractive power, having an image-side surface being convex near the optical axis, at least one of an object-side surface and the image-side surface of the fifth lens element being aspheric; and
    a sixth lens element with a negative refractive power, having an object-side surface being convex near the optical axis, at least one of the object-side surface and an image-side surface of the sixth lens element being aspheric;
    wherein a focal length of the first lens element is f1, a focal length of the second lens element is f2, and they satisfy the relation: $1.0 < f1/f2 < 3.0$.

2. The six-piece microscope lens system as claimed in claim 1, wherein the focal length of the second lens element is f2, a focal length of the third lens element is f3, and they satisfy the relation: $-2.0 < f2/f3 < -0.8$.

3. The six-piece microscope lens system as claimed in claim 1, wherein a focal length of the third lens element is f3, a focal length of the fourth lens element is f4, and they satisfy the relation: $-0.3 < f3/f4 < -0.1$.

4. The six-piece microscope lens system as claimed in claim 1, wherein a focal length of the fourth lens element is f4, a focal length of the fifth lens element is f5, and they satisfy the relation: $3.0 < f4/f5 < 7.0$.

5. The six-piece microscope lens system as claimed in claim 1, wherein a focal length of the fifth lens element is f5, a focal length of the sixth lens element is f6, and they satisfy the relation: $-1.0 < f5/f6 < -0.5$.

6. The six-piece microscope lens system as claimed in claim 1, wherein the focal length of the first lens element is f1, the focal length of the third lens element is f3, and they satisfy the relation: $-3.5 < f1/f3 < -2.0$.

7. The six-piece microscope lens system as claimed in claim 1, wherein the focal length of the second lens element is f2, a focal length of the fourth lens element is f4, and they satisfy the relation: $0.1 < f2/f4 < 0.4$.

8. The six-piece microscope lens system as claimed in claim 1, wherein a focal length of the third lens element is f3, a focal length of the fifth lens element is f5, and they satisfy the relation: $-1.1 < f3/f5 < -0.45$.

9. The six-piece microscope lens system as claimed in claim 1, wherein a focal length of the fourth lens element is f4, a focal length of the sixth lens element is f6, and they satisfy the relation: $-4.0 < f4/f6 < -2.2$.

10. The six-piece microscope lens system as claimed in claim 1, wherein the focal length of the first lens element is f1, a focal length of the second lens element and the third lens element combined is f23, and they satisfy the relation: $-0.25 < f1/f23 < -0.05$.

11. The six-piece microscope lens system as claimed in claim 1, wherein the focal length of the second lens element is f2, a focal length of the third lens element and the fourth lens element combined is f34, and they satisfy the relation: $-1.5 < f2/f34 < -0.8$.

12. The six-piece microscope lens system as claimed in claim 1, wherein a focal length of the second lens element and the third lens element combined is f23, a focal length of the fourth lens element and the fifth lens element combined is f45, and they satisfy the relation: $-16.0 < f23/f45 < -7.0$.

13. The six-piece microscope lens system as claimed in claim 1, wherein a focal length of the third lens element and the fourth lens element combined is f34, a focal length of the fifth lens element and the sixth lens element combined is f56, and they satisfy the relation: $-1.25 < f34/f56 < -0.60$.

14. The six-piece microscope lens system as claimed in claim 1, wherein a focal length of the fourth lens element and the fifth lens element combined is f45, the focal length of the sixth lens element is f6, and they satisfy the relation: $-1.3 < f45/f6 < -0.65$.

15. The six-piece microscope lens system as claimed in claim 1, wherein the focal length of the first lens element is f1, a focal length of the second lens element, the third lens element and the fourth lens element combined is f234, and they satisfy the relation: $0.05 < f1/f234 < 0.4$.

16. The six-piece microscope lens system as claimed in claim 1, wherein a focal length of the second lens element, the third lens element and the fourth lens element combined is f234, a focal length of the fifth lens element and the sixth lens element combined is f56, and they satisfy the relation: $4.0 < f234/f56 < 15.0$.

17. The six-piece microscope lens system as claimed in claim 1, wherein a focal length of the second lens element and the third lens element combined is f23, a focal length of the fourth lens element, the fifth lens element and the sixth lens element combined is f456, and they satisfy the relation: $-30 < f23/f456 < -12$.

18. The six-piece microscope lens system as claimed in claim 1, wherein the focal length of the second lens element is f2, a focal length of the third lens element, the fourth lens element and the fifth lens element combined is f345, and they satisfy the relation: $0.55 < f2/f345 < 1.1$.

19. The six-piece microscope lens system as claimed in claim 1, wherein the focal length of the first lens element is f1, a focal length of the second lens element, the third lens element, fourth lens element, the fifth lens element and the sixth lens element combined is f23456, and they satisfy the relation: $1.2 < f1/f23456 < 3.2$.

* * * * *